(12) United States Patent
Harris

(10) Patent No.: US 8,980,187 B2
(45) Date of Patent: Mar. 17, 2015

(54) DIESEL PARTICULATE FILTERS HAVING A WASHCOAT THAT IMPROVES FILTER PERFORMANCE

(75) Inventor: Thomas Harris, Waterloo, IA (US)

(73) Assignee: Deere & Company, Moline, IL (US)

( * ) Notice: Subject to any disclaimer, the term of this patent is extended or adjusted under 35 U.S.C. 154(b) by 322 days.

(21) Appl. No.: 13/306,387

(22) Filed: Nov. 29, 2011

(65) Prior Publication Data

US 2013/0133313 A1    May 30, 2013

(51) Int. Cl.
*F01N 3/022*     (2006.01)
*F01N 3/00*      (2006.01)

(52) U.S. Cl.
USPC ............ 422/177; 422/168; 422/180; 60/282; 60/297

(58) Field of Classification Search
USPC .......................................... 422/168, 177, 180
See application file for complete search history.

(56) References Cited

U.S. PATENT DOCUMENTS

| 7,083,842 B2* | 8/2006 | Masukawa et al. ............ 428/116 |
| 7,438,739 B2 | 10/2008 | Ziebarth et al. |
| 7,465,690 B2 | 12/2008 | Yan |
| 7,713,909 B2 | 5/2010 | Mao et al. |
| 7,771,669 B2 | 8/2010 | Chgapov et al. |
| 2004/0259731 A1* | 12/2004 | Yan ............................... 502/439 |
| 2005/0042151 A1* | 2/2005 | Alward et al. ................. 422/177 |
| 2007/0104623 A1* | 5/2007 | Dettling et al. ............... 422/177 |
| 2008/0087009 A1 | 4/2008 | Nishina et al. |
| 2012/0100336 A1* | 4/2012 | Cai et al. ....................... 428/116 |

* cited by examiner

*Primary Examiner* — Walter D Griffin
*Assistant Examiner* — Jelitza Perez
(74) *Attorney, Agent, or Firm* — Faegre Baker Daniels LLP

(57) ABSTRACT

Aspects of the invention include Diesel Particulate Filters (DPF) that include a layer of inert particles some of which are in contact with a catalyst and are associated with the surface of the filter. Particles associated with the inlet side of the filter are sized such that they coat portions of the inlet surface and portions of the channels that connect the inlet surface to the wall separating the inlet surface from the outlet surface. In some aspects the particles comprise alumina of between about 1.0 microns to about 40.0 microns and colloidal alumina particles that are between about 1.0 nm to about 10.0 nm. The coating is applied by contacting the filter body especially the inlet channels of the filter body with a washout that includes the different sized particles and at least one catalyst that facilitates the conversion of soot particles into gases.

19 Claims, 11 Drawing Sheets

DIESEL PARTICULATE FILTERS HAVING A WASHCOAT THAT IMPROVES FILTER PERFORMANCE

FIELD OF THE INVENTION

This invention relates to a diesel particulate filter and materials and methods for making the same.

BACKGROUND

Diesel engines are the preferred means of producing torque for use in a wide range of applications ranging from uses in transportation, such as heavy duty trucks, trains, off-road agricultural and mining equipment to the large scale production of on-site electrical power to name a few. Diesel engines are virtually unmatched in power to mass ratios, and the relative safety of their fuel makes diesel engines almost the only choice for use in applications that require mobile, dependable and safe sources of high torque.

Because of the type of fuel that they combust and because of their design, diesel engines invariably produce soot. Soot itself is a combination of predominately carbon particles and droplets of liquid, including hydrocarbons. In general, the larger the diesel engine, the more soot it produces. Accordingly, soot is a problem with all diesel engines especially large diesel engines such as those found in large trucks, trains, boats, electrical power generators, off-road construction, mining and agricultural equipment, and the like.

In order to limit the amount of soot released into the atmosphere, most industrialized nations regulate the amount of soot that a given engine can release into the atmosphere. Industry has responded by creating various systems for removing or at least reducing the amount of soot released into the atmosphere by diesel engines. Many of these systems can have a negative impact on fuel efficiency of the engine to which they are attached. In some cases, the mechanical integrity of the engine and the use of such systems add to the cost of producing and operating machines that use diesel engines. Aspects of the invention described herein provide materials, devices and methods of making and using the same that help to efficiently reduce the amount of soot released into the atmosphere by operating diesel engines.

SUMMARY

Some embodiments include Diesel Particulate Filters, comprising; a porous ceramic base, the base having a first surface in contact with exhaust from a diesel engine and a second surface in contact with the atmosphere and wherein the first and the second surfaces share an intervening porous wall; and a set of heat tolerant micro-particles, wherein the micro-particles are on the order of about 1 micron to about 40 microns across; and a set of heat tolerant colloidal particles, wherein the colloidal particles are on the order of about 1 nm to about 10 nm across, wherein said first and said second set of particles are deposited as a washcoat on at least one surface of the porous ceramic base. In some embodiments the micro-particles and the colloidal particles are comprised primarily of alumina. In some embodiments, the micro-particles in the washcoat used to coat the ceramic core of the DPF comprise between about 99 to about 80 percent of the total amount of particles in the washcoat on the Filter; in still other embodiments, the colloidal particles comprise between about 1 to about 20 percent of the total amount of particles in the washcoat on the Filter; and, in still other embodiments, the coating particles include a set of larger particles on the order of about 20 to about 50 microns. In still other embodiments a DPF includes a washcoat comprised predominately of micro and colloidal particles but also a demonstrative level of larger particles on the order of about 20 microns to about 50 microns across.

The Diesel Particle Filters, according to some aspects of the invention, include a catalytic component that is applied to the ceramic filter body of the DPF at the same time as the coating. In many embodiments, the catalyst is applied to the DPF as a component of a washcoat slurry that includes particles used to coat the ceramic core of the DPF. In some embodiments, the catalytic component of the inventive DPF includes at least one metal selected from the groups consisting of: platinum, palladium and the like. In still other embodiments, the DPF includes at least one catalytic metal oxide for example at least one oxide selected from the group consisting of cerium oxide, zirconium oxide, lanthanum oxide, yttrium oxide and the like.

Still other aspects of the invention include methods of manufacturing a diesel particulate filter, comprising the steps of: treating a diesel particulate filter with a washcoat slurry, wherein said washcoat slurry includes an aqueous carrier; and a first set of heat tolerant micro-particles, wherein the micro-particles are on the order of about 1 micron to about 40 microns across; and a second set of heat tolerant colloidal particles, wherein the colloidal particles are on the order of about 1 nm to about 10 nm across, wherein said first and said second set of particles are deposited on at least one surface of the diesel particulate filter. In some embodiments the micro-particles and the colloidal particles in the washcoat slurry are comprised primarily of alumina. In some embodiments the micro-particles in the washcoat slurry comprise between about 99 to about 80 percent of the total amount of particles in the final washcoat slurry. In some embodiments the colloidal particles in the wash coat slurry comprise between about 1 to about 20 percent of the total amount of particles in the washcoat slurry. In some embodiments in addition to having predominately micro and colloidal sized particles the washcoat slurry further includes a set of large particles wherein these particles are on the order of about 20 to about 50 microns in diameter.

In some embodiments in addition to the particles, the washcoat slurry includes a catalytic component. In some embodiments the catalytic component includes at least one metal selected from the group consisting of: platinum, palladium and rhodium. In some embodiments the slurry includes at least one metal oxide selected from the group consisting of: cerium oxide, zirconium oxide, lanthanum oxides, yttrium oxide, etc. In some embodiments the inventive slurry includes between about 5 wt. % to about 20 wt. % solids.

DESCRIPTION

For the purposes of promoting an understanding of the principles of the novel technology, reference will now be made to the preferred embodiments thereof, and specific language will be used to describe the same. It will nevertheless be understood that no limitation of the scope of the novel technology is thereby intended, such alterations, modifications, and further applications of the principles of the novel technology being contemplated as would normally occur to one skilled in the art to which the novel technology relates are within the scope of this disclosure and all reasonable inferences drawn therefrom.

As used herein, unless explicitly stated otherwise or clearly implied otherwise, the term 'about' refers to a range of values plus or minus 10 percent; e.g., about 1.0 encompasses values from 0.9 to 1.1.

Some embodiments of the invention are described in terms of the ranges of the percentages of the particles with a specific size range in the washcoat or washcoat slurry. It should be understood that the total percentage of particles in a given washcoat or washcoat slurry can never exceed 100 percent. Therefore, increasing the percentage of one set of particles in a given washcoat or washcoat shiny implies that the percentage of at least one other set of particles in the same washcoat or washcoat slurry must be reduced in order to maintain the sum of the percentages at 100 percent.

Exhaust produced by diesel engines, especially large engines such as those used in trains, heavy-duty trucks and off-road equipment, is generally treated by an exhaust treatment system before it is discharged into the atmosphere. Soot, comprised primarily of droplets of hydrocarbons and particles (mostly carbon), is one component of diesel exhaust. In order to comply with various environmental regulations, the level of soot discharged into the atmosphere is reduced by various exhaust treatment systems. One of the most widely used and efficient systems for reducing the amount of soot released into the atmospheres is a diesel particulate filter (DPF). In many embodiments, a DPF includes catalysts that aid in the conversion of soot particles into gases such as $CO_2$ and steam that is then discharged into the atmosphere. In some exhaust treatment systems, the system further includes catalysts that convert other components of diesel exhaust, such as carbon monoxide and un-combusted diesel fuel, into more environmentally benign molecules which are then discharged into the atmosphere. In some exhaust treatment systems, the system further includes catalysts that are able to convert nitrogen oxides into the form most suitable for promoting other desirable processes, such as passive soot oxidation on the DPF or selective catalytic reduction on the DPF or on a separate component downstream of the DPF.

Figure 1:
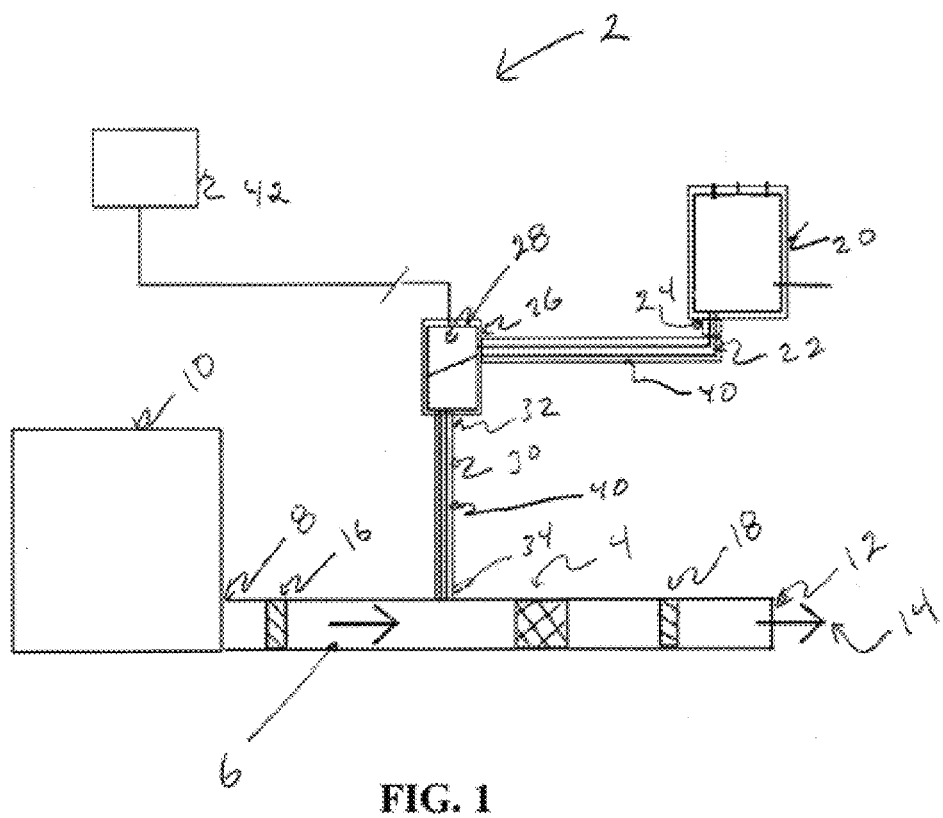
FIG. 1 A schematic diagram of a representative SCR exhaust treatment system for a diesel engine.

Referring now to FIG. 1, a schematic diagram of a typical heavy duty diesel exhaust treatment system 2. A DPF with catalyst 4 is positioned within an exhaust pipe 6. The exhaust pipe has two ends. One end 8 is connected to a source of diesel exhaust 10 and the other end 12 is vented to the atmosphere 14. A typical system may also include optional additional catalysts 16 and 18. Catalysts such as 16 and 18 may be involved in catalyzing the reaction of carbon monoxide and Nitrogen Oxides to $CO_2$ and $N_2$. The catalyst 4 generally catalyzes the oxidation of various compounds in the exhaust stream, including soot components into gases such as $CO_2$ and $H_2O$ in the vapor phase which may readily exit the filter.

Catalysts can catalyze the oxidation of hydrocarbons and CO in the exhaust to $CO_2$. There are two kinds of catalysts used in these applications, either passive or active. Catalysts used to convert soot into gases generally operate by taking advantage of the high temperatures of diesel exhaust. Catalytic systems that operate at normal exhaust temperature are referred to as passive systems. Passive systems operate more or less continuously and do not require the periodic introduction of extra energy, such as would come from the periodic introduction of diesel fuel into the exhaust stream. Many passive systems function by catalyzing the reaction of carbon particles with nitrogen dioxide according to equation 1 in a reaction that occurs above about 250° C.

$$C + NO_2 = CO_2 + NO \tag{1}$$

Passive systems, such as this, require a source of $NO_2$ which can be made catalytically by converting NO produced by diesel combustion into $NO_2$.

Still other systems for converting particulate soot into carbon dioxide are referred to as active systems. Active systems operate at high temperatures and these systems include materials for generating temperatures in the range of about 400 to about 700° C. A typical active system catalyzes the reaction given in equation 2:

$$C + O_2 = CO_2 \tag{2}$$

In many active systems, the exhaust temperature is periodically increased by introducing diesel fuel into the exhaust stream in proximity to the soot filter. This fuel in the exhaust stream reacts with the catalyst to create enough heat to combust the carbon soot particles into carbon dioxide.

Some DPFs use passive regeneration to remove excess soot from the filter. Passive regeneration generally employs catalysts that help to convert carbon base soot particles into $CO_2$ and operates at normal diesel engine exhaust temperature, for example from about 325 to about 420° C. Some DPFs use active regeneration to remove the soot. Some of these systems operate at temperatures as high as 700° C.

Referring again to FIG. 1, the very high temperatures necessary for active soot removal from DPFs may be generated using heating elements (not shown). In some systems, the temperatures are generated by the periodic introduction of diesel fuel via a first valve 32 or a second valve 34 into the exhaust pipe 6 through supplemental fuel line 40. The flow of diesel fuel may be regulated by a supplemental diesel fuel relay 28 that is connected on its inlet side to a diesel fuel inlet line 22 which is connected on its inlet side to a diesel fuel tank 20. The outlet from fuel relay 28 is connected to outlet fuel line 30. The supplemental diesel fuel relay 28 may be activated by a control 42 that processes information on factors such as engine back pressure, exhaust gas temperature, engine run time and the like. The controller also controls the action of supplemental fuel relay 28 to introduce diesel fuel directly into the exhaust system as necessary.

Figure 2:
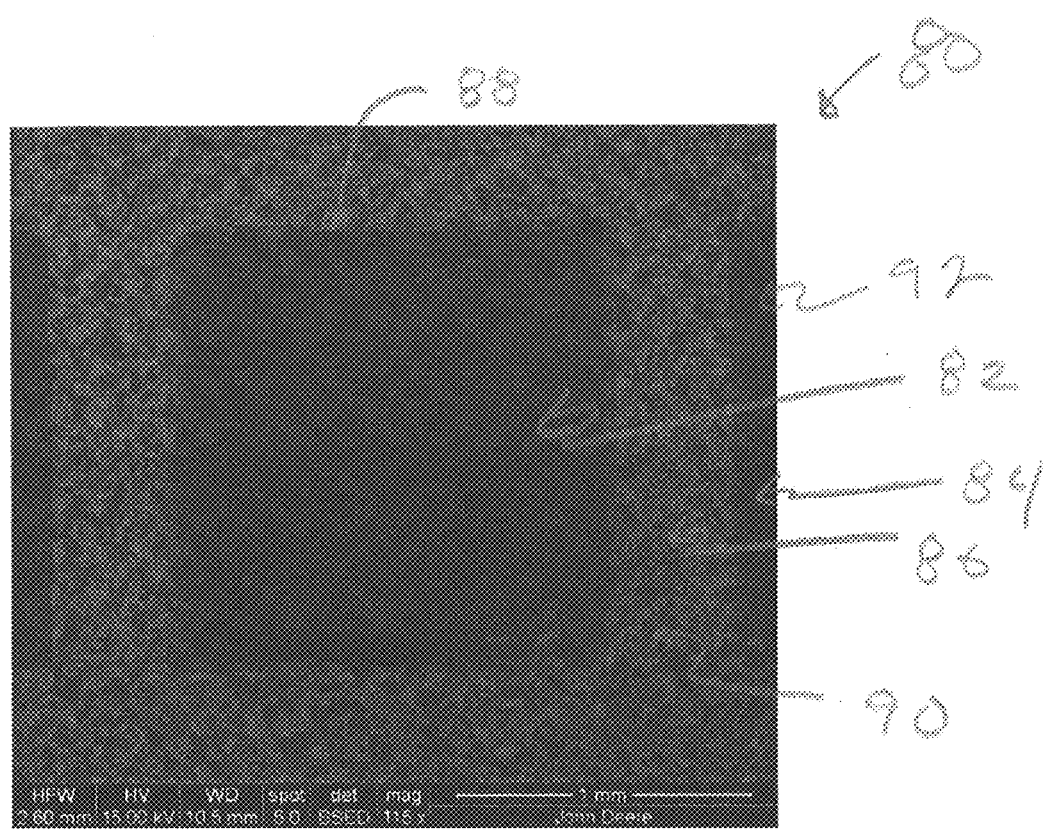
FIG. 2 A photomicrograph cross sectional view showing a DPF inlet channel, wall and outlet channel.

Typical diesel particulate filters are honeycombed structures comprising a series of parallel adjacent channels (sometime referred to as chambers). Referring now to FIG. 2, a photograph of the cross section of a typical DPF filter 80. Typical DPFs 80 are constructed of thin walls 86, and 88 that separate, e.g. a series of adjacent and complimentary channels. These channels can be separated into two complimentary groups of channels, for example, inlet channel 82 and outlet channel 84. The ends of the channels in the inlet set of channels are plugged at the end of the channels that are furthest from the source of the diesel exhaust and open on the end of the channels that are closest to the source of exhaust gas. In contrast, the ends of the outlet channels are plugged at the ends of the channels that are closest to the source of the diesel exhaust and open on the ends of channels that are closest to opening to the atmosphere.

Since the ends of the first set of channels are open at the end of the channels closest to the source of exhaust gas and plugged at the end of the channels furthest from the source of engine exhaust gas, exhaust gas can enter the first set of channels but it cannot directly exit the first set of channels. Accordingly, the plugged filter core is constructed such that diesel exhaust entering the inlet channels 82 cannot exit to the atmosphere unless it passes through pores 90 in the filter wall 86 separating the inlet channels 82 from the outlet channels 84 by traversing the pores 90 in the wall 86. As the pores 90 are generally too small to allow particles of soot to readily traverse the internal walls 86 and 88 of the filter body 80 most soot particles are trapped in the inlet channels 82 of the filter 80. In a typical DPF, the pores 90 in the filter walls 86 and 88 are large enough to allow exhaust gases to escape from the channels 82 in direct contact with the engine and enter the channels 84 on the side of the filter that ultimately vents to the atmosphere.

In their simplest form, diesel particulate filters function by physically trapping soot particles that are too large to traverse the pores of the filter walls separating the chamber first receiving engine exhaust from the channels open to the atmosphere. As a practical matter, most of these filters allow some soot to pass through until a layer of soot accumulates on the filter surface.

Widely used porous ceramic filter bodies include those made of materials such as silicon carbide, cordierite, mullite and combinations of these compounds. The efficient and prolonged functioning of these devices is dependent in part on the porosity of these structures. The porosity of the typical filter body is in the range of about 30% to about 75%. In some filters, the porosity of the ceramic filter body is in the range of at least about 40%, sometimes at least 55%. In still other filters, the porosity of the ceramic filter bodies is in the range of about at least 55%, or at most about 65%. And, in some filters, the porosity of the ceramic filter bodies are in the range of about at least 65% and less than or equal to about 75%.

The ceramic "body" of the porous filter is usually made by extruding a honeycomb structure that has a multitude of channels; each channel is separated from its adjacent channel by thin porous walls. Alternating channels of the honeycomb structure are plugged at opposite ends in order to form the final core body of the DPF.

Figure 3A:
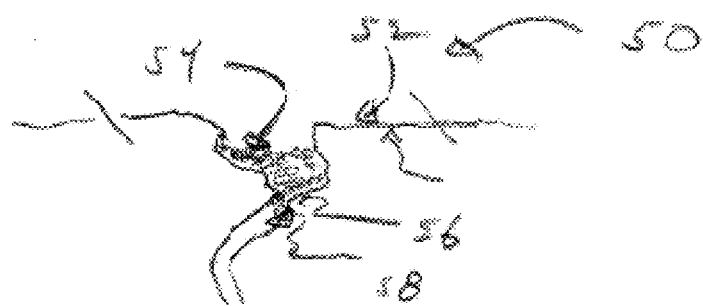
FIG. 3A A cartoon showing a single filed DPF pore packed with, for example, soot.
Figure 3B:
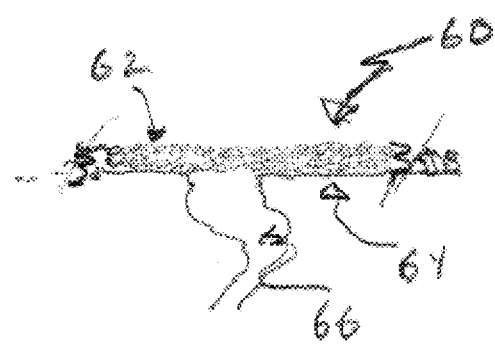
FIG. 3B A cartoon showing a 'layer' of soot deposited on the inlet surface of a DPF.

Referring now to FIG. 3A, in a typical DPF, soot 54 is initially trapped within the pores 56 of the porous wall 52 of the filter body 50. This 'deep bed filtration' causes a significant increase in pressure drop, see, for example, FIG. 3D. Referring now to FIG. 3B, following the initial deposition soot, a layer of soot 62 sometimes referred to as a soot cake forms on the surface of the walls 64 of the channels first receiving the soot ('inlet channels') of the DPF 60. As the soot layer 62 builds, the pressure drop increases, albeit at a slower rate (See FIG. 3D). Referring now to FIG. 3B, a certain level of soot 62 may be beneficial as functioning particulate filter that includes a layer of soot deposited on the surface of the filter is more efficient at removing 'newly' deposited soot than is a clean filter. With a typical DPF, this occurs because the soot layer itself becomes a barrier to soot transmission from the exhaust stream into the atmosphere.

Figure 3C:
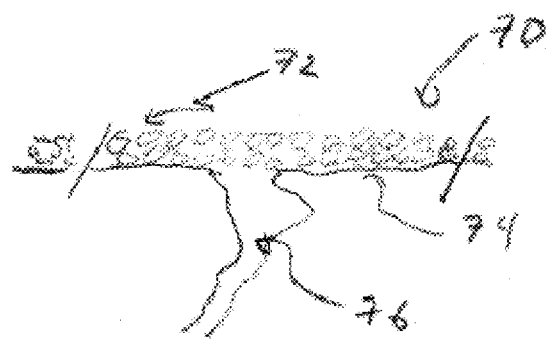
FIG. 3C A cartoon showing a membrane found on the surface of a DPF filter body.
Figure 3D:
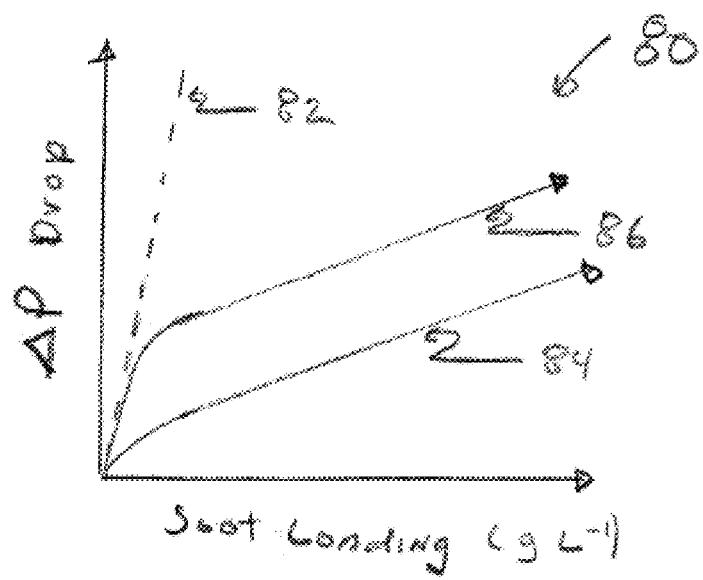
FIG. 3D A hypothetical plot illustrating the effects of soot build-up on exhaust gas pressure drop predicted for different DPF configurations.

However, if the soot layer deposited on the filter surfaces becomes too thick or begins to compress, the soot layer will increase the pressure drop and thus reduce the flow of particles and gases from the engine to the atmosphere (see, e.g., the plot in FIG. 3D). Left unchecked, excess soot build-up increases engine back pressure which can result in shutdown or even damage to the engine.

Completely (or at least partially) eliminating deep bed filtration can reduce the overall pressure drop across the DPF. Referring now to FIG. 3C, this can be accomplished by placing a layer of material 72 often times referred to as a membrane on the surface of the walls 74 of the DPF's inlet channels 70. Accordingly, some DPF are manufactured to include a membrane that limits access of the soot particles to the pores of the filter walls excess soot build-up. Some filters include a membrane that is formed on the inlet surface of the filter body. These membranes 72 are comprised of heat stable and gas permeable materials that allow for the ready flow of diesel exhaust gases from the inlet channels of the DPF to the pores 76 that traverse the DPF wall 74 separating the inlet and outlet channels. In a typical commercially available DPF, these membranes are produced from essentially the same ceramic material as the underlying DPF. These conventional membrane layers may themselves have the structure of a "packed bed" of uniformly sized particles. These membranes prevent all or nearly all soot particles 78 from entering the pores 76 of the filter body where they may accumulate and clog the pores, thereby restricting exhaust gas flow through the filter and raising the back pressure experienced by the engine. The inter-particle spacing in the membrane layer is large enough not to restrict the flow of exhaust gases through the DPF (i.e., the pressure drop across the DPF in the clean state is not increased). Thus, the initial pressure drop increase with soot accumulation is greatly reduced see e.g. FIG. 3D.

While this membrane DPF design is innovative, it suffers from two disadvantages. First, the application of the membrane by the DPF manufacturer involves extra processing steps (including an extra firing), which causes the component to be more expensive. Second, the presence of the membrane makes it more difficult to apply a catalytic washcoat to the surfaces of the inlet channels; conventional coatings will plug up the inter-particle spaces within the packed bed membrane structure.

The inventive DPFs disclosed herein address at least two deficiencies in the currently available membrane bearing DPFs. First the inventive washcoat is applied in a single step that provides both catalyst and a means of reducing the tendencies of soot particle to plug pores in the DPF filter walls. This single step application obviates the need for a separate step to apply a membrane. And the same particles in the washcoat shiny that form structures in the pores to reduce soot fouling also help to secure catalyst to the surface of the DPF.

Some embodiments of the invention comprise DPFs that have a washcoat that includes alumina particles comprising both micro- and nano-particles. The washcoat may be applied to the DPF filter body using a washcoat slurry. The same slurry that delivers the alumina particles may also include catalysts that are instrumental in reducing the levels of regulated compound in the exhaust gas stream. The same slurry can also deliver catalysts to the inlet channels of the DPF that catalyze the conversion of soot particles in to $CO_2$. The final result is a DPF that has a layer of alumina particles which function much like a membrane in that it reduces the number of pores clogged with soot particles. Because this layer is readily applied in the same washcoat slurry as the catalysts, using this approach eliminates the need for the separate step required to form a conventional membrane. This approach reduces the number of steps required to form the DPF. This in turn reduces the complexity, time and expense of producing DPFs that function at reduced back pressures.

Developing a DPF washcoat that has the desirable qualities of being both heat stable, and resistant to excessive soot pore plugging required developing a heretofore unexpected mixture of particles. Some of the particle combinations that were tried, including many combinations that failed, are summarized in Table 1.

Figure 4A:
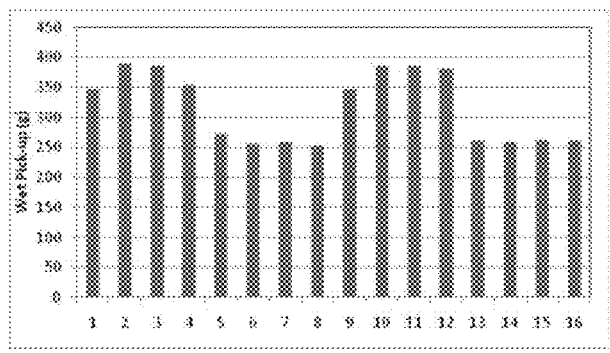
FIG. 4A A bar graph showing wet pick-up (g) values measured with DPFs treated with the different washcoats summarized in Table 1.
Figure 4B:
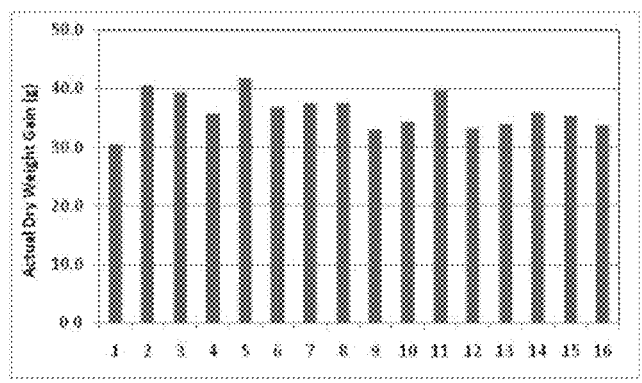
FIG. 4B A bar graph showing actual thy weight gain (g) values measured with DPFs treated with the different washcoats summarized in Table 1.

Experimental filters were tested to determine, among other parameters, the wet and dry weights of the otherwise equivalent filters after they were treated with different washcoat slurries. These parameters help to determine the amount of material in the washcoat slurry that was initially applied to the filters and the amount retained after drying. Some of these comparative weights are summarized in the bar graphs shown in FIGS. 4A and 4B.

One experimental DPF was created using relatively large (50-100 micrometers in diameter), spherical particles of alumina. These particles were produced by wet milling a commercial alumina powder. Colloidal alumina (nanometer-sized alumina particles suspended in water) was added to the same washcoat slurry that included the 50-100 micron particles in order to enable those particles to stick together and to stick to the surface of the underlying ceramic material of the DPF. These two set of particles were mixed together in water, drawn into and then distributed throughout the DPF by air flow (driven by vacuum), and then dried using first hot air flow followed by calcining in a furnace at 500° C.

Refer now to FIG. 3C, a cartoon illustrating the washcoat resulting from this approach. Unfortunately, a washcoat with these sized particles did not adhere well to the surface of the inlet channels. Still another problem with this washcoat was that it created a filter with a large pressure drop. Experiments were initially conducted to try and create washcoat for DPF inlet and outlet surfaces that could double as a membrane by creating a layer of large alumina particles on the surfaces of a DPF. The initial approach resulted in a layer comprised of large alumina particles and a high level of colloidal alumina particles. The large particles did not readily adhere to the DPF filer core surface. In order to get the large particles to form a surface, it was necessary to include a high level of colloidal material in the washcoat slurry. This combination resulted in the formation of a thick surface that was too thick and well-packed to allow exhaust gases to traverse the washcoat.

Another washcoat that was tried included a third set of particles with a defined diameter between about 10 to about 40 microns. A washcoat slurry that included all 3 particle sets was used to coat a DPF ceramic filter body. Coating, drying, and calcining produced an adherent washcoat. However, instead of a packed bed structure similar to FIG. 3C, a different structure was observed. The mid-sized, irregularly-shaped alumina particles (referred to as micro-particles) penetrated into many of the large pores at the surface of the inlet channels, effectively creating a localized packed bed within those features, while the large and excess small particles formed a separate uneven coating on the surface.

Figure 5:
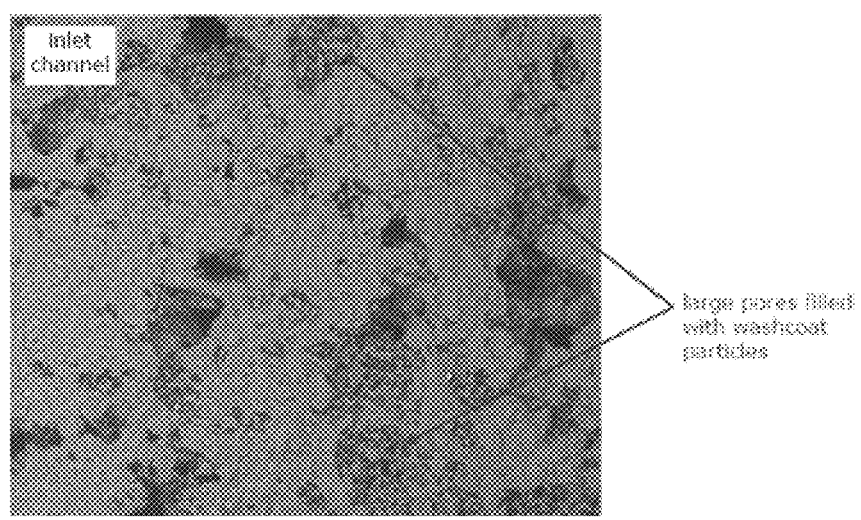
FIG. 5 A photomicrograph (800×) of an open side view illustrating the structure of a DPF inlet, wall, and outlet of a DPF treated with washcoat combination number 1 (small diameter particle, low solids content, Table 1).

Combinations of particle in the washcoat slurries that created the best washcoats included a mixture of irregular shaped intermediate sized particles and a relatively small amount of colloidal particles. Refer now to FIG. 5, a photomicrograph of one of the best performing coated DPFs. The large pores in the wall of the inlet channel are filled with irregular shaped midsized particles and a small amount of colloidal material that appears to help the mid-sized particle maintain their position in the larger pores of the ceramic body.

Figure 6:
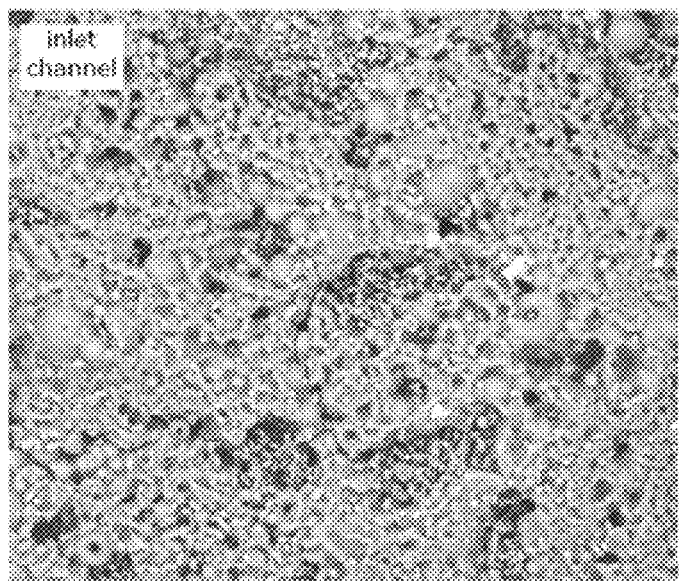
FIG. 6 A photomicrograph (800×) of an open side view illustrating the inlet channel, of a DPF treated with a washcoat combination number 1 (Table 1).

Refer now to FIG. 6, a photomicrograph of the inlet channel wall of a DPF treated with alumina particles that produced a filter exhibiting sub-optimal performance. This filter core was treated with a washcoat slurry comprising high levels of both spherical macro particles and colloidal particles. The slurry had to include high levels of colloidal materials to help the large spherical particle adhere to the filter surface as they were too large to enter the large pores of the filter surface. The washcoat formed using this mixture of alumina particles was thick. The large amount of colloidal material also formed a very tightly packed matrix of particles that interfered with the passage of exhaust gases through the filter, creating a filter that exhibited a high pressure drop. This may be because, when present as a large portion of a washcoat slurry, colloidal sized particles have a tendency to pack together tightly.

Figure 7:
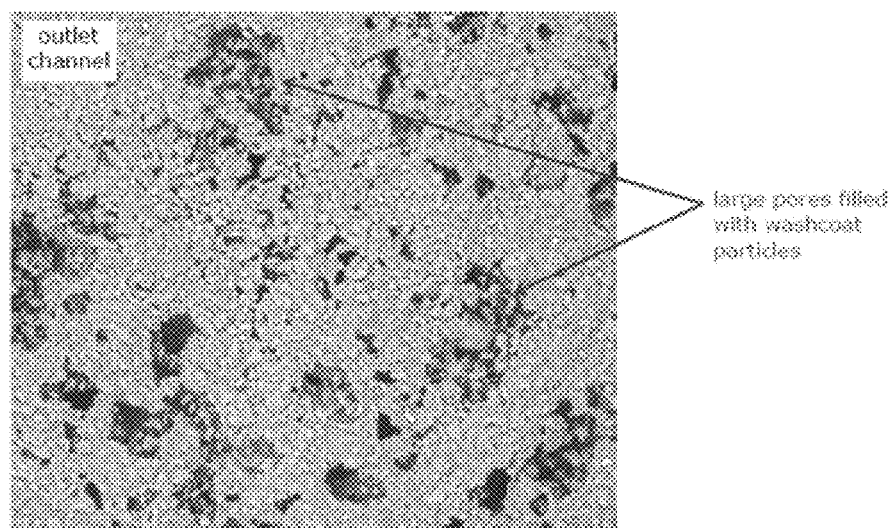
FIG. 7 A photomicrograph (800×) of an open side view illustrating porous structure, of DPF outlet channel, of a DPF treated with washcoat combination number 1 (Table 1).

Refer now to FIG. 7, a high magnification view of the outlet channel of the DPF exhibiting an exemplary inventive washcoat. The washcoat formed on this filter was made with using a washcoat slurry that comprised predominately irregular shaped mid-sized alumina particles and a small amount of colloidal alumina particles. As observed with the inlet channel, the outlet channel formed with this inventive combination of alumina particles formed a surface in which primarily the large pores were at least partially filled with a combination of irregular shaped mid-sized particles and a relatively small number of colloidal particles. This DPF exhibited acceptable levels of back pressure due to a surface that is resistant to soot plugging. Most importantly, the membrane was created in the same step required to apply catalyst to the filter.

Surprisingly, some of the most efficient washcoats that were formed were comprised on mixture of irregular-shaped, medium-sized alumina particles and small amount of colloidal alumina. This combination produced a washcoat that accumulated predominately in the larger pores. These washcoats were discontinuous but should still function to prevent soot from packing the filter wall pores while allowing the DPF to operate with an acceptable pressure drop.

Without being limited to any theory or explanation, these results can be explained as follows: First, it is not necessary to create an idealized membrane structure on the surface of the inlet channels. Instead, pores open to DPF core surface may be occupied with a packed bed of irregularly shaped particles, creating a "membrane effect" (i.e., the exclusion of soot from the large pores). Second, it is much easier to get alumina particles to adhere to each other and to the ceramic surface if they are packed into a large pore. Finally, through optimization of the alumina particle size and colloidal alumina amount, it is possible to form a localized membrane structure without increasing the clean DPF pressure drop significantly. Additional options for the coating slurry or the coating process follow and provide a path for further optimizing the catalytic membrane washcoat. The process used to produce the exemplary washcoated DPFs disclosed herein features aggressive mixing of the washcoat slurry to reduce the effects of settling. If the optimum diameter of the micro-particles of alumina is large enough to cause the particles to settle from the slurry, a thickening agent can be added to the slurry to reduce the settling rate. And, if an even lower clean DPF pressure drop is desired, one can add small heat labile polymer spheres to the washcoat slurry. Properly sized polymer spheres may penetrate into the largest pores, occupying some of the space therein and thereby limiting the number of alumina particles that can pack into the pores. The polymer listed will burn away during calcining, thus, leaving more open space within the localized packed bed structure within the surface pores of the DPF.

Many DFPs are manufactured using washcoat to deliver catalytic particles onto the surfaces of the DPF. Most catalytic washcoats applied to DPFs are aqueous-based suspensions of a support material, preferably a heat stable solid that binds to the ceramic filter, and a catalyst. Considering the issue of deep bed filtration noted above, a washcoat material that forms a thin packed bed architecture or membrane and also provides a medium for delivering the catalyst necessary for the treatment of the exhaust gas components is desirable. It is also more cost effective to introduce this feature during the application of the washcoat in contrast to the manufacture of the DPF, since in the latter case it will require additional process steps.

Some of the inventive DPFs are treated with a washcoat that includes particles which bind to the surfaces of the filter core. These particles are delivered to the surfaces of the filter via the coating process. The resultant washcoat includes heat stable particles of a defined particle size. The bulk of the coating slurry is generally water or some other suitable fluid. It was discovered that washcoats comprised of predominately large particles of a compound, such as alumina, tended to adhere less well to the surfaces of the filter core. Washcoats composed of mostly very small particles showed very high back pressure as a result of the particles plugging off the pores of the filter core. Accordingly, as disclosed herein, the optimal washcoat should be comprised of particles of specific ranges that enable both good adherence of the washcoat, the formation of a sufficiently porous membrane on the channel surfaces, and the absence of particles deep in the pores that are capable of severely restricting exhaust gas flow through the pores.

The relative amounts of the various sized particles in the washcoat slurry were also important. Treating filter bodies with a washcoat slurry comprised predominately of more than 20% of colloidal alumina particles produced a filter that exhibited high back pressure. The small particles have a tendency to pack into the pores of the filter and to inhibit the ready flow of gases through the porous filter wall.

In some aspects of the invention, the catalytic washcoat that is used to create the filter forms a thin packed bed architecture which helps to reduce the soot induced pressure drop. Some aspects of the invention encompass washcoat materials as well as the process by which these inventive washcoats are applied to the DPF. Washcoat particles that are larger than normal have reduced 'external geometric surface areas'. These types of washcoats have a reduced ability to disperse the precious metal catalyst. One way to compensate for this is to create a washcoat that includes mesoporous particles. Such mesoporous particles possess a high surface area suitable for catalyst dispersion.

Conventionally, washcoat particles that are suspended in aqueous-based washcoats have a tendency to settle out of the suspension. In the absence of some form of continuous or periodic mixing, the larger particles in the suspensions settle out of the washcoat before the coating process can be completed. Accordingly, many conventional washcoat slurries include a thickening agent that increases the viscosity of the fluid which aids suspension of the particles. Generally, this thickening agent is composed of an organic material that can burn away during the calcining process that follows coating the filter body with the washcoat.

In some embodiments, a material that blocks the largest pores within the walls of the DPF is added to the washcoat. Materials suitable for use in the washcoat include polymer beads such as with a diameter slightly larger than the median pore diameter of the porous ceramic filter body.

EXPERIMENTAL

Filter Treatments

Commercial DPFs not including a membrane layer on the inlet channel surfaces were utilized in the demonstration of this unique design. A proprietary water-based washcoat slurry was produced from alumina particles of various sizes. The sizes of the particles and the amount of particles in each washcoat was varied to produce a number of washcoats having varying sized particles and solids contents, expressed as percent solids. Test washcoats were applied to separate DPF cores under vacuum, and then dried. The particle sizes of the alumina were obtained by wet-milling commercially available alumina particles. In some cases, the washcoat slurries comprising alumina were themselves wet milled in order to adjust the size of the alumina particles included in the slurries. In addition to varying the size of the alumina particles in the washcoat slurries, the amounts of the alumina particles in the slurries were varied as well. The slurries were agitated during the application process to ensure that a representative distribution of the washcoat was applied to the DPF cores.

After drying, DPFs with washcoats were tested to determine their backpressure. Washcoats comprising different distributions of particle sizes as well as different solids content were made and tested. Coating parameters that were considered in the study included the vacuum strength (vacuum is used to distribute the coating slurry uniformly throughout the inlet channels) and drying direction (hot air was forced through the coated part, from one end or the other). A summary of some of the coating conditions that were tested are listed in Table 1.

TABLE 1

A summary of washcoat slurry parameters and process parameters utilized to create prototypes. The Vacuum Strength relates to drawing the slurry up into the DPF, the end of the part that receives the slurry is defined as the Inlet Face. Heat Direction refers to the flow of air during drying, which is applied to either the Inlet Face or the other end (Outlet Face) of the DPF.

| Combination Number | Lab Sample Number | D50 (microns) | Solids (%) | Vacuum Strength | Heat Direction |
|---|---|---|---|---|---|
| 1 | 3525 | 20.88 | 12.26 | Low | Inlet Face |
| 2 | 3526 | 20.88 | 12.26 | High | Inlet Face |
| 3 | 3524 | 20.88 | 12.26 | Low | Outlet Face |
| 4 | 3523 | 20.88 | 12.26 | High | Outlet Face |
| 5 | 3522 | 20.88 | 15.22 | Low | Inlet Face |
| 6 | 3521 | 20.88 | 15.22 | High | Inlet Face |
| 7 | 3520 | 20.88 | 15.22 | Low | Outlet Face |
| 8 | 3519 | 20.88 | 15.22 | High | Outlet Face |
| 9 | 3518 | 27.87 | 12.26 | Low | Inlet Face |
| 10 | 3517 | 27.87 | 12.26 | High | Inlet Face° |
| 11 | 3511 | 27.87 | 12.26 | Low | Outlet Face |
| 12 | 3516 | 27.87 | 12.26 | High | Outlet Face |
| 13 | 3512 | 27.87 | 15.22 | Low | Inlet Face |
| 14 | 3513 | 27.87 | 15.22 | High | Inlet Face |
| 15 | 3515 | 27.87 | 15.22 | Low | Outlet Face |
| 16 | 3514 | 27.87 | 15.22 | High | Outlet Face |

Washcoat Visualization

Washcoat distributions within individual Diesel Particulate Filter were determined by sectioning treated filters and visualizing the sections under a microscope. Briefly, two 1×6 cores were removed from each prototype filter. Next, one core from each prototype was cut into 2 inch long subsections comprising inlet, middle and outlet sections. Each subsection was cut axially to expose channels for imaging in the unmounted state. Unmounted mid-section samples from all prototypes were examined as were outlet sections from some of the prototypes that were analyzed. Sections from some of the prototypes were also mounted in epoxy and then polished to a flat smooth surface, which allowed the porous walls of the DPF to be examined in cross-section.

While the novel technology has been illustrated and described in detail in the figures and foregoing description, the same is to be considered as illustrative and not restrictive in character. It is understood that only the preferred embodiments have been shown and described and that all changes and modifications that come within the spirit of the novel technology are desired to be protected. As well, while the novel technology was illustrated using specific examples, theoretical arguments, accounts, and illustrations, these and the accompanying discussion should by no means be interpreted as limiting the technology. All patents, patent applications, and references to texts, scientific treatises, publications, and the like referenced in this application are incorporated herein by reference in their entirety.

I claim:

1. A Diesel Particulate Filter, comprising:
    a porous ceramic base, the base having a first surface in contact with exhaust from a diesel engine and a second surface in contact with the atmosphere and wherein the first and the second surfaces share an intervening porous wall; and
    a set of heat tolerant, irregularly-shaped micro-particles, wherein the micro-particles are on the order of about 1 micron to about 40 microns across; and
    a set of heat tolerant colloidal particles, wherein the colloidal particles are on the order of about 1 nm to about 10 nm across, wherein said micro-particles and said colloidal particles are deposited on at least one surface of the porous ceramic base, and wherein said micro-particles and said colloidal particles are deposited discontinuously on at least one inlet surface of the porous ceramic base.

2. The Filter according to claim 1, wherein the micro-particles and the colloidal particles are comprised primarily of alumina, and wherein a combination of the colloidal particles and micro-particles comprises a washcoat.

3. The Filter according to claim 2, wherein the micro-particles comprise between about 99 to about 80 percent of the total amount of particles in the washcoat applied to the Filter.

4. The Filter according to claim 2, wherein the colloidal particles comprise between about 1 to about 20 percent of the total amount of particles in the washcoat applied to the Filter.

5. The Filter according to claim 1, wherein the Filter may further include a set of large particles on the order of about 20 microns to about 50 microns.

6. The Filter according to claim 1, wherein the Filter further includes a catalytic component.

7. The Filter according to claim 6, wherein the catalytic component includes at least one metal selected from the group consisting of: platinum, palladium and rhodium.

8. The Filter according to claim 6, wherein the catalytic component includes at least one metal oxide selected from the group consisting of: cerium oxide, zirconium oxide, lanthanum oxides, and yttrium oxide.

9. A method of manufacturing a diesel particulate filter, comprising the steps of:
    treating a diesel particulate filter with a washcoat, wherein said washcoat includes:
        a carrier; and
        a set of heat tolerant, irregularly-shaped micro-particles, wherein the micro-particles are on the order of about 1 micron to about 40 microns across; and
        a set of heat tolerant colloidal particles, wherein the colloidal particles are on the order of about 1 nm to about 10 nm across, wherein said first and said second set of particles are deposited on at least one surface of the diesel particulate filter, and wherein said micro-particles and said colloidal particles are deposited discontinuously on at least one inlet surface of the porous ceramic base.

10. The method according to claim 9, wherein the micro-particles comprise between about 99 to about 80 percent of the total amount of particles in the washcoat on the Filter.

11. The method according to claim 9, wherein the colloidal particles comprise between about 1 to about 20 percent of the total amount of particles in the washcoat on the Filter.

12. The method according to claim 9, wherein the washcoat includes a set of large particles on the order of about 20 to about 50 microns.

13. The method according to claim 9, wherein the Filter further includes a catalytic component.

14. The method according to claim 13, wherein the catalytic component includes at least one metal selected from the group consisting of: platinum, palladium and rhodium.

15. The method according to claim 13, wherein the catalytic component includes at least one metal oxide selected from the group consisting of: cerium oxide, zirconium oxide, lanthanum oxides, and yttrium oxide.

16. The method according to claim 9, wherein the coating includes between about 5 wt. % to about 20 wt. % solids.

17. The filter according to claim 1, wherein said micro-particles and said colloidal particles fill large pores in the wall of the inlet surface.

18. The Filter according to claim 1, wherein said micro-particles and said colloidal particles are deposited separately and unevenly throughout the surface of the porous ceramic base.

19. The Filter according to claim 17, wherein said micro-particles and said colloidal particles are deposited separately and unevenly throughout the surface of the porous ceramic base.

* * * * *